United States Patent
Fuse

(10) Patent No.: US 6,671,612 B2
(45) Date of Patent: Dec. 30, 2003

(54) VEHICLE IDLING STOP SYSTEM

(75) Inventor: Toru Fuse, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 220 days.

(21) Appl. No.: 09/959,984

(22) PCT Filed: Mar. 16, 2001

(86) PCT No.: PCT/JP01/02104
§ 371 (c)(1),
(2), (4) Date: Nov. 14, 2001

(87) PCT Pub. No.: WO01/71181
PCT Pub. Date: Sep. 27, 2001

(65) Prior Publication Data
US 2002/0161507 A1 Oct. 31, 2002

(30) Foreign Application Priority Data
Mar. 21, 2000 (JP) .............................. 2000-077961

(51) Int. Cl.[7] .......................... F02N 11/08; F02D 29/02
(52) U.S. Cl. .................... 701/112; 123/179.4; 307/10.6
(58) Field of Search ................................ 701/112, 113; 123/179.4; 307/10.6

(56) References Cited

U.S. PATENT DOCUMENTS 4,494,497 A * 1/1985 Uchida et al. ........... 123/179.4

FOREIGN PATENT DOCUMENTS

| JP | 60-237254 | 11/1985 |
| JP | 4-298663 | 10/1992 |
| JP | 9-072266 | 3/1997 |

* cited by examiner

Primary Examiner—Andrew M. Dolinar
(74) Attorney, Agent, or Firm—Foley & Lardner

(57) ABSTRACT

When engine shutdown conditions are satisfied while an engine 1 is running, a controller 10 automatically shuts down the engine 1 (idling stop state). When the engine 1 is automatically shut down and engine restart conditions are satisfied, the engine 1 is driven by a motor 2 and the engine 1 is restarted. At this time it is determined that the vehicle is in a deterioration state when the increase rate of the rotation speed of the engine 1 after starting driving the engine 1 with the motor 2 is low. Thereafter idling stop is prohibited. Furthermore when it is determined that the vehicle is on an up-slope, determination of deterioration state is not performed. The engine 1 is driven by the motor 2 and the engine 1 is immediately restarted.

9 Claims, 4 Drawing Sheets

VEHICLE IDLING STOP SYSTEM

FIELD OF THE INVENTION

The present invention relates to a vehicle idling stop system which automatically turns off and restarts an engine.

BACKGROUND OF THE INVENTION

A vehicle disclosed in JP-A-H9-72266 published by the Japanese Patent Office in 1997 automatically turns off an engine in order to improve fuel efficiency when engine shutdown conditions are satisfied. Thereafter when an engine restart condition is satisfied, the engine is driven by a motor and automatically restarted.

SUMMARY OF THE INVENTION

When the vehicle is provided with a torque converter, creep torque when the vehicle starts is generated according to the input rotation speed to the torque converter. That is to say, it is generated according to the rotation speed of the engine and motor. Thus when engine restart conditions are satisfied and the vehicle starts moving, the generation of creep torque is delayed corresponding to the delay of increase of the motor rotation speed.

Normally this delay is short and it does not affect start-up performance. However deterioration in the battery or motor or increases in friction in the engine or drive system (hereafter referred to as "deterioration state") may result in weakening of the increase rate of the motor and engine rotation speed when the vehicle starts. As a result, the generation of creep torque is delayed and start-up performance reduced.

Thus it is preferable to determine whether the vehicle is in the deterioration state and to prohibit automatic shutdown of the engine (idling stop) if it is determined that the vehicle is in the deterioration state. If idling stop is prohibited, the engine will keep running even when the vehicle stops and creep torque is always generated to some extent. As a result, delay in the generation of creep torque can be prevented.

However, when the vehicle is on an up-slope, the increase rate of the rotation speed of the motor and engine will weaken due to increases in resistance applied to the drive wheels even when the vehicle is not in the deterioration state. Thus when the determination deterioration state is performed, it is necessary to distinguish the up-slope situation from the deterioration state.

Furthermore when the vehicle is restarted on an up-slope, the vehicle start-up performance is reduced if start-up control for a flat road is performed, because sufficient driving torque for the resistance applied to the drive wheels is not obtained.

It is therefore an object of this invention to provide a vehicle idling stop system which accurately detects deterioration state. It is a further object of this invention to allow smooth restarting of the vehicle even when the vehicle is on an up-slope.

In order to achieve above object, this invention provides a vehicle idling stop system comprising an engine, a motor which is connected to the engine, a torque converter, a drive wheel which is connected to either of the engine and the motor via the torque converter and which is driven by either of the engine and the motor, and a microprocessor. The microprocessor is programmed to determine whether an engine shutdown condition is satisfied when the engine is running, shut down the engine when the engine shutdown condition is satisfied, determine whether engine restart condition is satisfied when the engine is shut down, drive the engine with the motor and determine whether the vehicle is on an up-slope when the engine restart condition is satisfied, determine whether an increase rate in the rotation speed of the engine before restarting the engine after start up of driving of the engine with the motor is lower than a predetermined rate when the vehicle is not on an-up slope, and prohibit the shutdown of the engine based on the engine shutdown condition when it is determined that the increase rate in the rotation speed of the engine is lower than the predetermined rate.

The details as well as other features and advantages of this invention are set forth in the remainder of the specification and are shown in the accompanying drawings.

DESCRIPTION OF THE PREFERRED EMBODIMENTS

Figure 1:
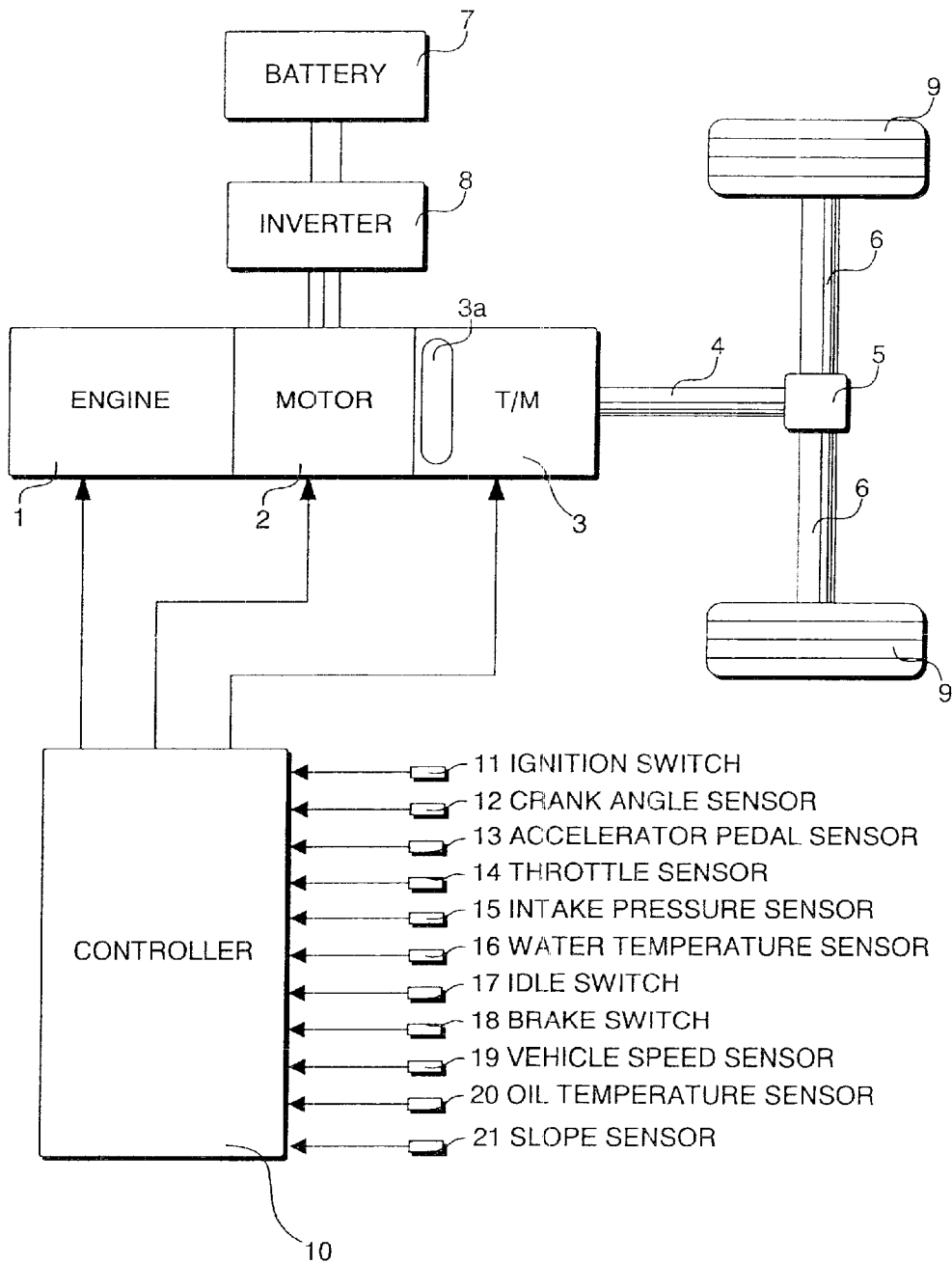
FIG. 1 is a schematic diagram of an idling stop system according to this invention.

Referring now to FIG. 1 of the drawings, a hybrid vehicle is provided with an engine 1 and a motor generator 2 which is connected to the engine 1, and rotates in synchrony with the engine 1.

The output of the engine 1 and the motor generator 2 is transmitted to a transmission 3 provided with a torque converter (fluid clutch) 3a, a transmission output shaft 4, a differential gear unit 5 and finally to drive wheels 9 via drive shafts 6.

The motor generator 2 is connected to a high-voltage battery 7 through an inverter 8. Electrical power is supplied to the motor generator 2 from the battery 7 when the engine 1 is started (engine start-up when the ignition switch is in the ON position or engine restart from an idling stop state), and the motor generator 2 drives the engine 1. The motor generator 2 functions as an electrical generator except when the engine 1 starts up and charges the battery 7 with generated electrical power. That is to say, the motor generator 2 is used as a motor for starting the engine 1. At other times, the motor generator 2 is not supplied with electrical power from the battery 7 and does not function as a motor. Therefore the battery 7 may have a small capacity.

A controller 10 controls the engine 1, the motor generator 2 and the transmission 3. The signals from the following sensors are input to the controller 10.

An ignition switch 11

A crank angle sensor 12 which detects a rotation speed Ne of the engine 1 based on a crank angle signal An accelerator pedal sensor 13 which detects an accelerator pedal operation amount APO A throttle sensor 14 which detects a throttle opening TVO of the engine 1

An intake pressure sensor 15 which detects an intake pressure downstream of the throttle (negative pressure in the intake manifold)

A water temperature sensor 16 which detects a temperature Tw of cooling water in the engine 1

An idle switch 17 which is placed in an ON position when the accelerator pedal is not depressed or when the throttle is fully closed A brake switch 18 which is placed in an ON position when a brake pedal is depressed A vehicle speed sensor 19 which detects a vehicle speed VSP An oil temperature sensor 20 which detects an oil temperature Toil of the torque converter 3a A slope sensor 21 which detects a slope based on the direction of gravitational acceleration applied to the vehicle.

Figure 2:
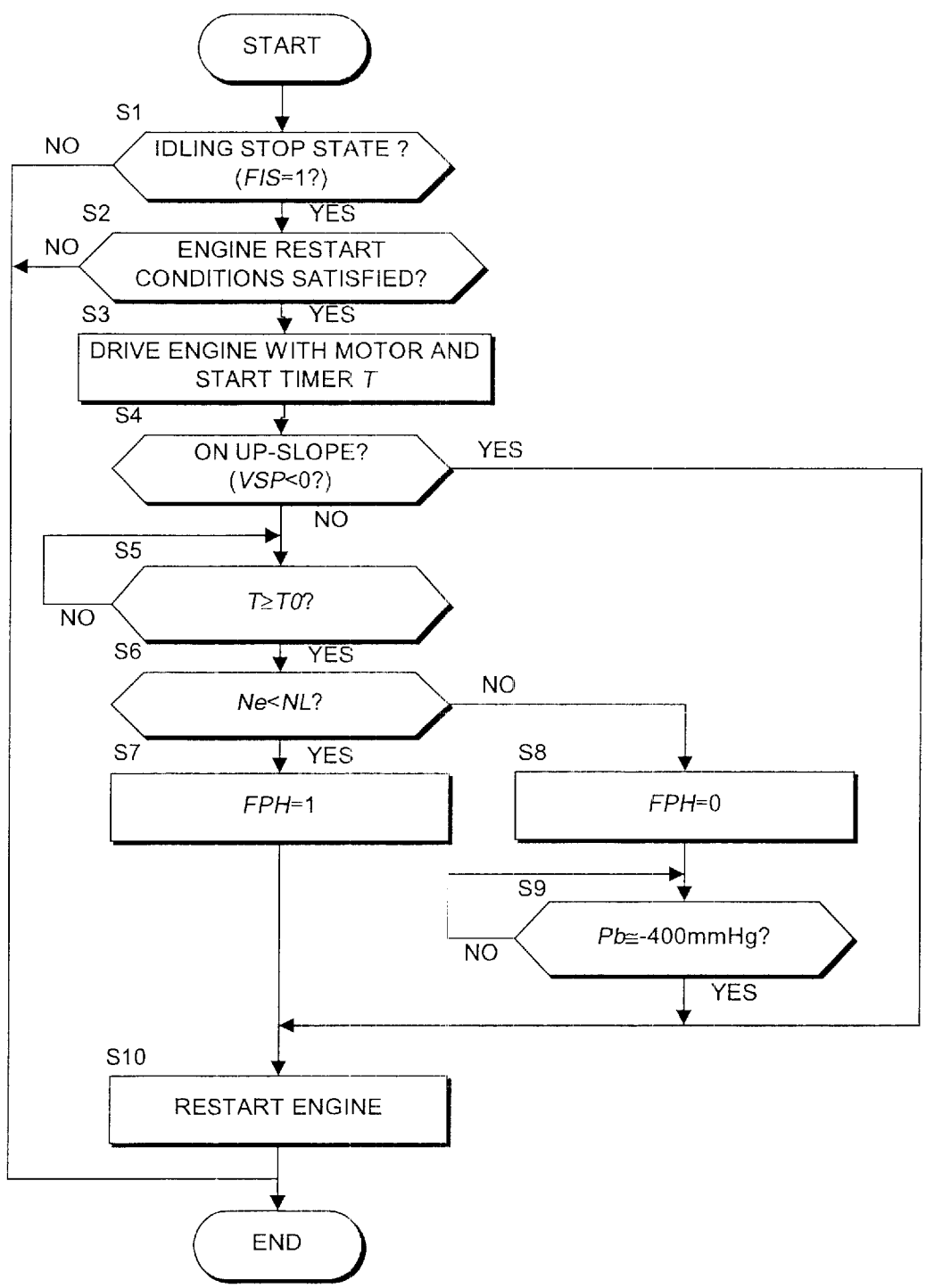
FIG. 2 is a flowchart of an engine restart routine.

FIG. 2 is a flowchart of an engine restart routine performed when the ignition switch 11 is in the ON position and the engine 1 is automatically shut down (the vehicle is in the idling stop state).

In a step S1, it is determined whether or not the engine 1 has been automatically shut down (the vehicle is in the idling stop state) based on a flag FIS. The routine proceeds to a step S2 when the flag FIS is "1" and it is determined that the vehicle is in the idling stop state. When the flag FIS is "0", it is determined that the vehicle is not in the idling stop state and the routine is terminated.

In the step S2, it is determined whether engine restart conditions are satisfied. For example, engine restart conditions are satisfied when the idle switch 17 is in the OFF position (accelerator pedal is depressed) and the brake pedal switch 18 is in the OFF position (brake pedal is released). When it is determined that engine restart conditions are satisfied, the routine proceeds to a step S3. When it is determined that engine restart conditions are not satisfied, the routine is terminated.

In the step S3, the engine 1 is driven by the motor generator 2. At the same time, a timer T is started.

In a step S4, it is determined whether or not the vehicle speed VSP detected by the vehicle speed sensor 19 has a negative value. When the vehicle speed VSP is negative, it is determined that the vehicle is on an up-slope and the vehicle is backed. In the step S4, when it is determined that the vehicle speed VSP is greater than or equal to zero and that that therefore the vehicle is not on an up-slope, the routine proceeds to a step S5. Whether the vehicle is on slope may be determined based on the direction of the gravitation acceleration detected by the slope sensor 21.

In the step S5, it is determined on the basis of the value of the timer T whether or not the elapsed time from start-up of driving the engine 1 with the motor generator 2 has reached a deterioration determination time T0 (for example, T0=0.2 seconds). When it is determined that the time elapsing from start-up of driving the engine 1 with the motor generator 2 has reached the deterioration determination time T0, the routine proceeds to a step S6.

In the step S6, it is determined whether or not the rotation speed Ne of the engine 1 which is driven by the motor generator 2 is smaller than a deterioration determination threshold NL. When the deterioration determination time T0 is set to 0.2 seconds, the deterioration determination threshold NL is set to 900 rpm for example. When the increase rate in the rotation speed of the engine 1 is smaller than a predetermined rate (4500 rpm/second), it is determined that the vehicle is in the deterioration state.

Figure 3:
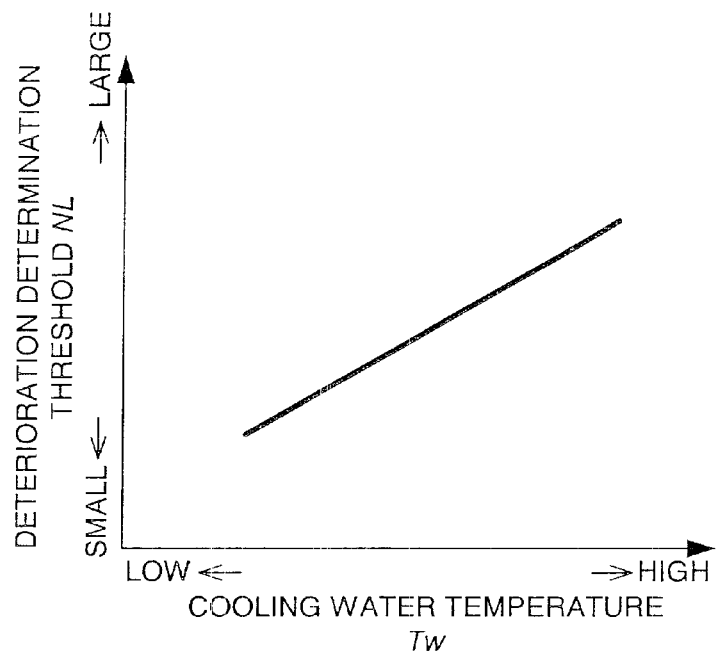
FIG. 3 is a table for setting a deterioration determination threshold.

The deterioration determination threshold NL may be corrected in response to the cooling water temperature Tw of the engine 1 by referring to the table shown in FIG. 3. Friction in the engine 1 increases as the temperature of the cooling water in the engine 1 decreases. This results in lower increases in the rotation speed of the engine 1. Therefore the deterioration determination threshold NL is corrected to smaller values as the cooling water temperature Tw of the engine 1 decreases.

Figure 4:
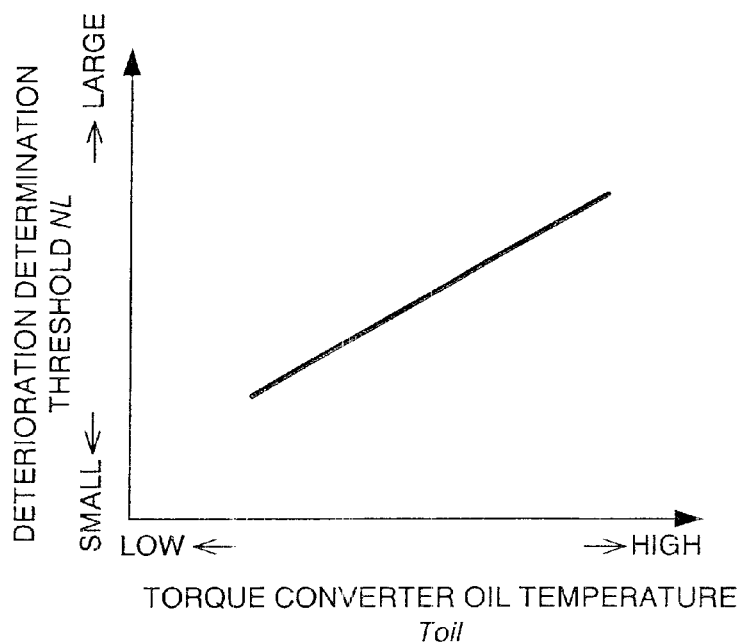
FIG. 4 is another table for setting a deterioration determination threshold.

The deterioration determination threshold NL may be corrected in response to the oil temperature Toil of the torque converter 3a by referring to the table shown in FIG. 4. Friction in the torque converter 3a increases as the temperature of the oil in the torque converter 3a decreases which results in lower increases in the rotation speed of the engine 1. Therefore the deterioration determination threshold NL is corrected to smaller values as the oil temperature Toil of the torque converter 3a decreases.

When the deterioration determination threshold NL is corrected in response to the cooling water temperature Tw of the engine 1 or the oil temperature Toil of the torque converter 3a, the determination accuracy of deterioration state can be improved.

It is also possible to determine whether the vehicle is in the deterioration state by measuring the elapsed time from start-up of driving the engine 1 with the motor generator 2 to the rotation speed of the engine 1 reaching a predetermined rotation speed. When the time required for the rotation speed of the engine 1 to reach a predetermined rotation speed exceeds a predetermined threshold, it may be determined that the vehicle is in the deterioration state.

In the step S6, when it is determined that the rotation speed Ne of the engine 1 is smaller than the deterioration determination threshold NL, it is determined that the increase rate of the rotation speed of the engine 1 is less than the predetermined increase rate and the vehicle is in the deterioration state.

In a step S7, the flag FPH is set to "1" which shows prohibition of automatic shutdown of the engine 1 (idling stop prohibited). In this manner, as described below, subsequent idling stop is prohibited. Thereupon the routine proceeds to a step S10 and the engine 1 is restarted immediately by performing engine sparking and fuel injection.

On the other hand, when it is determined in the step S6 that the engine rotation speed Ne is greater than or equal to the deterioration determination threshold NL, it is determined that the vehicle is in the deterioration state and the routine proceeds to a step S8. In the step S8, the flag FPH is set to "0" which shows that idling stop is permitted.

Then the routine proceeds to a step S9 and it is determined whether or not the intake pressure Pb of the engine 1 detected by the intake pressure sensor 15 has reached an intake pressure which corresponds to that during idling (for example, −400 mmHg). The intake pressure is a relative pressure using atmospheric pressure as a reference pressure. An intake pressure of −400 mmHg means that the intake pressure is 400 mmHg lower than atmospheric pressure.

When it is determined that the intake pressure Pb has reached a pressure corresponding to idling, the routine proceeds to the step S10 and the engine 1 is restarted by performing the engine sparking and fuel injection. Rapid increases in engine torque can be suppressed by restarting the engine 1 after an intake pressure has been developed in this manner. Therefore it is possible to prevent deterioration in fuel efficiency or shock when starting the vehicle.

When the intake pressure Pb has reached a predetermined pressure, the engine 1 is restarted. However the engine 1 may be restarted when the fuel injection amount of the engine 1 is less than or equal to a predetermined amount (for example, the fuel injection time Tp is less than 4 milliseconds), or when the rotation speed Ne of the engine 1 has risen to a predetermined value (grater than the deterioration determination threshold NL). Furthermore, by measuring the elapsed time from the start-up of driving the engine 1 with the motor generator 2, the engine 1 may be restarted when the elapsed time has reached a predetermined value (for example, 1.2 seconds).

On the other hand, when the vehicle is determined to be on an up-slope in the step S4, the deterioration determination routine from the step S5 to the step S8 is not performed, and the prohibition of idling stop based on the deterioration determination is not performed. This is because when the vehicle is on an up-slope, torque applied to the drive wheels 9 increases which results in lower increases in the rotation speed of the engine 1. Therefore it is not possible to accurately determine the deterioration state. Thus in this case, the routine proceeds to the step S10 and the engine 1 is immediately restarted. Since the engine 1 is restarted before an intake pressure has developed, the fuel injection amount is large in proportion to the intake air amount Thus it is possible to generate a large engine torque which corresponds to increases in the resistance applied to the drive wheels 9. In this manner, it is possible to ensure smooth start-up even when the vehicle is on an up-slope.

Figure 5:
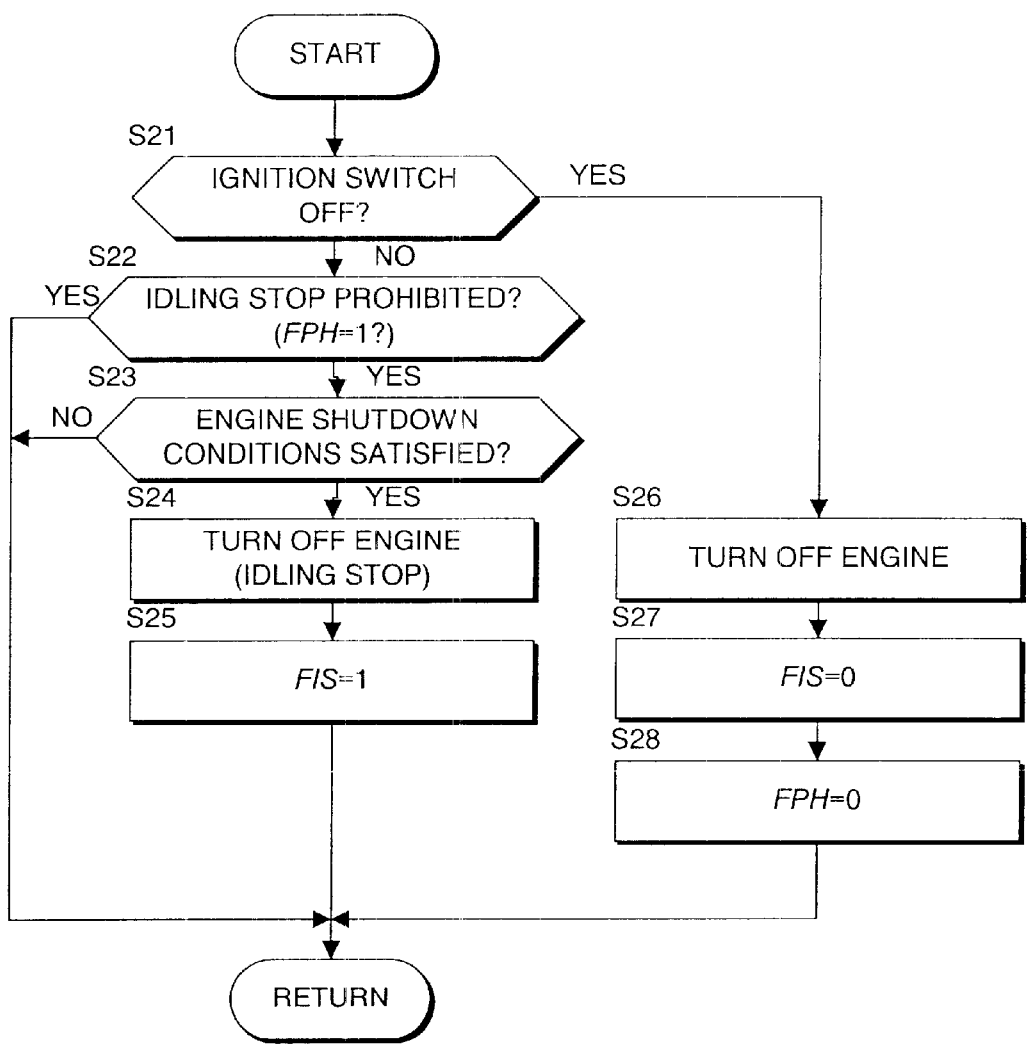
FIG. 5 is a flowchart of an engine shutdown routine.

FIG. 5 is a flowchart of an engine shutdown routine executed when the engine 1 is running.

In a step S21, it is determined whether or not the ignition switch 11 is in an OFF position. When the ignition switch 11 is not in the OFF position, the routine proceeds to a step S22.

In the step S22, it is determined whether or not automatic shutdown of the engine 1 (idling stop) has been prohibited based on the flag FPH. When idling stop is prohibited (FPH=1), the routine is terminated. When idling stop is permitted (FPH=0), the routine proceeds to a step S23.

In the step S23, it is determined whether or not the engine shutdown conditions are satisfied. More precisely, when the following conditions are all satisfied, it is determined that engine shutdown conditions are satisfied.

The idle switch 17 is in the ON position.

The engine rotation speed Ne is approximately equal to a rotation speed during idling.

The vehicle speed VSP is zero.

The brake switch 18 is in the ON position.

When the engine shutdown conditions are not satisfied, the routine is terminated. When the engine shutdown conditions are satisfied, the routine proceeds to a step S24.

In the step S24, the engine 1 is automatically shut down. In a step S25, the flag FIS is set to "1" which shows that the engine 1 is now automatically shut down (in the idling stop state) and the routine is terminated. On the other hand, when the ignition switch in the OFF position in the step S21, the routine proceeds to a step S26 and the engine 1 is shut down. In a step S27, the flag FIS is set to "0" which shows that the vehicle is not in the idling stop state. In the step S28, the flag FPH is set to "0" which shows that idling stop is permitted and the routine is terminated. The reason that the flag FPH is set to "0" when the ignition switch 11 is in the OFF position is to release the prohibition on idling stop when the vehicle has ceased operating even when idling stop had been prohibited when the vehicle was previously operating.

The entire contents of Japanese Patent Application P2000-77961 (filed Mar. 21, 2000), from which the present application claims priority, are incorporated herein by reference.

Although the invention has been described above by reference to specific embodiments of the invention, the invention is not limited to the embodiments described above. Modifications and variations of the embodiments described above will occur to those skilled in the art, in light of the above teachings. The scope of the invention is defined with reference to the following claims.

INDUSTRIAL APPLICABILITY

As described above, the idling stop system is useful to prohibit the idling stop in the deterioration state and enhance start-up performance. And it is also useful to enhance start-up performance when the vehicle restarts on an up-slope from idling stop state.

What is claimed is:

1. A vehicle idling stop system comprising:
   an engine (1);
   a motor (2) which is connected to the engine (1);
   a torque converter (3a);
   a drive wheel (9) which is connected to either of the engine (1) and the motor (2) via the torque converter (3a) and which is driven by either of the engine (1) and the motor (2); and
   a microprocessor (10) which is programmed to:
      determine whether an engine shutdown condition is satisfied when the engine (1) is running,
      shut down the engine (1) when the engine shutdown condition is satisfied,
      determine whether engine restart condition is satisfied when the engine (1) is shut down,
      drive the engine (1) with the motor (2) and determine whether the vehicle is on an up-slope when the engine restart condition is satisfied,
      determine whether an increase rate in the rotation speed of the engine (1) before restarting the engine (1) after start up of driving of the engine (1) with the motor (2) is lower than a predetermined rate when the vehicle is not on an up-slope, and
      prohibit the shutdown of the engine (1) based on the engine shutdown condition when it is determined that the increase rate in the rotation speed of the engine (1) is lower than the predetermined rate.

2. The vehicle idling stop system as defined in claim 1, wherein the microprocessor (10) is further programmed to:
   measure elapsed time after start up of driving of the engine (1) with the motor (2);
   determine whether the rotation speed of the engine (1) after a predetermined time has elapsed after start up of driving the engine (1) with the motor (2) is smaller than a deterioration determination threshold; and
   determine that the increase rate in the rotation speed of the engine (1) is lower than the predetermined rate when it is determined that the rotation speed of the engine (1) after the predetermined time has elapsed after start up of driving the engine (1) with the motor (2) is smaller than the deterioration determination threshold.

3. The vehicle idling stop system as defined in claim 1 wherein the microprocessor (10) is further programmed to restart the engine (1) at approximately the same time as driving the engine (1) with the motor (2) when it is determined that the vehicle is on an up-slope.

4. The idling stop system as defined in claim 1 wherein the microprocessor (10) is further programmed to restart the engine (1) when an intake pressure of the engine (1) has reached a pressure corresponding to a intake pressure during idling, when it is determined that the vehicle is not on an up-slope.

5. The vehicle idling stop system as defined in claim 2 wherein the deterioration determination threshold is set to increase as a cooling fluid temperature of the engine (1) increases.

6. The vehicle idling stop system as defined in claim 2 wherein the deterioration determination threshold is set to increase as an oil temperature in the torque converter (3a) increases.

7. The vehicle idling stop system as defined in claim 1 further comprising a sensor (19) which detects a vehicle speed, and wherein the microprocessor (10) is further programmed to determine whether the vehicle is on an up-slope based on the vehicle speed.

8. The vehicle idling stop system as defined in claim 1 further comprising a sensor (21) which detects the direction of a gravitational acceleration, and wherein the microprocessor (10) is further programmed to determine whether the vehicle is on an up-slope based on the direction of the gravitational acceleration.

9. A vehicle idling stop system comprising:

an engine (1);

a motor (2) which is connected to the engine (1);

a torque converter (3*a*);

a drive wheel (9) which is connected to either of the engine (1) and the motor (2) via the torque converter (3*a*) and which is driven by either of the engine (1) and the motor (2);

means for detecting whether an engine shutdown condition is satisfied when the engine (1) is running;

means for shutting down the engine (1) when the engine shutdown condition is satisfied;

means for determining whether engine restart condition is satisfied when the engine (1) is shut down;

means for driving the engine (1) with the motor (2) and determining whether the vehicle is on an up-slope when the engine restart condition is satisfied;

means for determining whether an increase rate in the rotation speed of the engine (1) before restarting the engine (1) after start up of driving of the engine (1) with the motor (2) is lower than a predetermined rate when the vehicle is not on an up-slope; and means for prohibiting the shutdown of the engine (1) based on the engine shutdown condition when it is determined that the increase rate in the rotation speed of the engine (1) is lower than the predetermined rate.

\* \* \* \* \*